(12) United States Patent
Chiu et al.

(10) Patent No.: US 10,983,307 B2
(45) Date of Patent: Apr. 20, 2021

(54) APERTURE SWITCHING DEVICE FOR USE WITH A LENS OF A MOBILE DEVICE

(71) Applicant: Intelligent Mechatronics Industry Co., Ltd., Taoyuan (TW)

(72) Inventors: Chi-Wei Chiu, Taoyuan (TW); Yung-Yun Chen, Taoyuan (TW)

(73) Assignee: Intelligent Mechatronics Industry Co., Ltd., Taoyuan (TW)

( * ) Notice: Subject to any disclaimer, the term of this patent is extended or adjusted under 35 U.S.C. 154(b) by 239 days.

(21) Appl. No.: 16/118,525

(22) Filed: Aug. 31, 2018

(65) Prior Publication Data
US 2020/0073089 A1    Mar. 5, 2020

(51) Int. Cl.
*G02B 13/00* (2006.01)
*G02B 7/10* (2021.01)
*H04N 5/225* (2006.01)

(52) U.S. Cl.
CPC .......... *G02B 13/0015* (2013.01); *G02B 7/10* (2013.01); *H04N 5/2254* (2013.01)

(58) Field of Classification Search
CPC ... G03B 9/02; G03B 9/04; G03B 9/06; G03B 9/08; G03B 9/10; G03B 9/958; G03B 9/24; G03B 21/044; G03B 7/10; G03B 21/0044; G03B 13/001

See application file for complete search history.

(56) References Cited

U.S. PATENT DOCUMENTS

2019/0018303 A1* 1/2019 Chiu ...................... G03B 9/02

* cited by examiner

*Primary Examiner* — Darryl J Collins
*Assistant Examiner* — Journey F Sumlar
(74) *Attorney, Agent, or Firm* — Lin & Associates Intellectual Property, Inc.

(57) ABSTRACT

The invention provides an aperture switching device for use with lens of mobile device. The lens of the mobile phone or the portable electronic product usually has a fixed aperture of lens, and the aperture size cannot be adjusted. Therefore, the invention provides an aperture switching device for the lens, comprising a plate base, a driving mechanism, a connecting rod and a transfer mechanism, wherein the transfer mechanism comprises a insert piece having a light-transmissive hole, wherein the driving mechanism moves the connecting rod to move the insert piece toward the lens, and replaces the lens aperture with the light-transmissive hole of the insert piece. As such, the invention achieves the purpose of changing the aperture of the lens, and the lens aperture of the mobile device can be substantially switched.

18 Claims, 12 Drawing Sheets

APERTURE SWITCHING DEVICE FOR USE WITH A LENS OF A MOBILE DEVICE

BACKGROUND OF THE INVENTION

1. Field of the Invention

The present invention relates generally to an aperture switching device, and more particularly to an aperture switching device for use with a lens of a mobile device, wherein in addition to the aperture of the lens, with the aperture switching device, the aperture of the lens is replaced by the aperture switching device, so that the lens aperture of the mobile device has the function of actual switching the aperture.

2. The Prior Arts

Due to advance of smart phones and since every single smart phone has camera recording function, majority of smart phone users change their habit of taking pictures with their smart phone instead of the conventional camera, which has no phone function. With the constant production of new smart phones, the smart phone manufacturers emphasize the promotion of the highest pixel resolution and the large aperture function of the new smart phone. It is noted that few people understand that the aperture of camera attached in the smart phone is constant.

The enlargement and reduction of the aperture is achieved by the movement of the diaphragm blades controlled by a driving motor. Since the smart phone is in the trend of miniaturization in size and weight, installation of a motor for activation of the diaphragm blades is impossible even if other optical components are not taken into account. The motor to be installed has limited power and the dissipation of heat resulted from the other components associated with the motor should also be considered. In short, the receiving and heat dissipation spaces of the smart phone must be increased and is against the main production process of the smart phone. Therefore, presently the aperture value of the camera unit in the smart phone is constant in order to economize the space for receiving and installing of components therein.

In addition to the large space occupied by the driving motor and high power consumption by the driving motor, the aperture structure of the camera lens also occupies a substantial space. For instance, the aperture value of an iris diaphragm is adjusted by changing the dimension of diaphragm blades such that once the virtual shutter release button is touched, the diaphragm blades open or close depending on the aperture value setting. As a matter of fact, the shuttle structure defining the aperture is usually made up of a plurality of diaphragm blades one overlapping the other such that the diaphragm blades open or close depending on the aperture value setting selected. To be more specific, the overlapping diaphragm blades still occupy a certain extent of space even though they are relatively thin and hence the lens itself may protrude outwardly from the phone body such that scratching on the lens is still possible. In other words, an adjustable aperture disposed in a smart phone nowadays is still impossible.

SUMMARY OF THE INVENTION

A primary objective of the present invention is to provide an aperture switching device for use with a lens of a mobile device, wherein a conventional aperture blade is not used, and the drive mechanism does not use a motor, so that the mechanism is very compact, and the overall mechanism can be miniaturized, as well as suitable for installation in increasingly thin and light mobile devices.

To achieve the above objective, the specific technical means of the present invention comprises: a plate base, a driving mechanism, a connecting rod and a transfer mechanism; the plate base being disposed outside a lens barrel, and the lens barrel being disposed with a light-transmissive channel in axial direction, the plate base having two plate surfaces and a circumferential side surface, the two plate surfaces being located on front and rear sides of the plate base, and one side of the circumferential side surface being close to or abutting against outer circumference of the lens barrel.

The driving mechanism, the connecting rod and the transfer mechanism are all disposed on a plate surface, the driving mechanism and the transfer mechanism are movably disposed on the plate surface in a manner of relatively moving with respect to a vertical axis of the lens barrel; the driving mechanism is disposed on a left side or a right side of the lens barrel, and the transfer mechanism is disposed on the vertical axis of the lens barrel; the driving mechanism is coupled to the transfer mechanism by the connecting rod, wherein the connecting rod is connected between the driving mechanism and an insert in a manner parallel to horizontal axis of the lens barrel.

Wherein the driving mechanism comprises at least a sliding plate and a first SMA wire, the first SMA wire is disposed parallel to the vertical axis, and a first end of the first SMA wire is fixed to the sliding plate and a second end of the first SMA wire is fixed to the plate base.

The transfer mechanism comprises an insert piece having a light-transmissive hole, the insert piece is oppositely disposed on the vertical axis of the lens barrel and movable along the vertical axis on the plate surface, wherein inner diameter of the light-transmissive hole is smaller than inner diameter of the light-transmissive channel; when the first SMA wire is heated and shortened, the sliding plate is first driven by the first SMA wire, thereby sequentially driving the connecting rod and the insert piece to move, the insert piece moves towards the lens barrel, and moves to a position where the light-transmissive hole and the light-transmissive channel are mutually corresponding, at this point, amount of light entering the lens barrel is decided by the diameter of the light-transmissive hole.

Through the above technical means, the objective of changing the aperture of the diameter of the aperture of the lens can be achieved, and the function that the lens aperture of the mobile device can be actually switched can be realized.

In an embodiment of the present invention, a portion of the plate base further defines a notch, the notch has a contour corresponding to the outer contour of the lens barrel, a portion of the lens barrel is received in the notch, and the lens barrel can directly abut against the notch.

In an embodiment of the present invention, a first fixed terminal is disposed on a side of the plate base and spaced apart from the sliding plate, and the second end of the first SMA wire is fixed to the first fixed terminal instead of to the plate base, and the first fixed terminal is fixed to a side of the plate base away from the lens barrel.

In an embodiment of the present invention, a shaft is further disposed protruding from the plate base, and two ends of the connecting rod are a first end and a second end, the first end has a shaft hole, and the sliding plate further comprises a guiding long hole and a joint opening, the guiding long hole is disposed in a lower half of the sliding plate and corresponding to the shaft hole, the shaft passes through the guiding long hole and the shaft hole to make the first end pivotally connected to the shaft, wherein two long sides of the guiding long hole are in constant contact with the shaft, and the long side of the guiding long hole is in the same direction as the vertical axis of the lens barrel; a portion of a long side of the sliding plate is bent into a folded edge, and an opening is formed in the folded edge to form the joint opening, and the first end is stuck into the joint opening.

In an embodiment of the present invention, the present invention further comprises a grounding terminal and an elastic member, the grounding terminal is disposed on the plate surface, the sliding plate has two openings, and the two openings are disposed adjacent to each other and in moving direction of the sliding plate, and the grounding terminal protrudes through one of the two openings, and the other opening is disposed longitudinally with a span rod, and the two ends of the elastic member abut against the grounding terminal and the span rod respectively.

In an embodiment of the present invention, the second end of the connecting rod has a trepan hole, a guiding carrier is further disposed between the second end and the insert piece, and the guiding carrier uses a surface facing the plate surface to be integrally connected with the insert piece; a protruding rod is disposed protruding from a surface of the guiding carrier facing away from the plate surface, and the second end is sleeved on the protruding rod using the trepan hole; and further comprises a guiding wall, the guiding wall is disposed upright on the plate base, a side of the guiding wall facing the guiding carrier is a guiding plane, and the guiding plane is parallel to the vertical axis of the lens barrel; one end of the guiding carrier abuts the guiding plane, wherein the guiding wall is magnetic and can magnetically attract the guiding carrier.

In an embodiment of the present invention, an upper positioning block and a lower positioning block are respectively disposed at top end and bottom end of the guiding wall, and the upper positioning block and the lower positioning block are both magnetic, the upper positioning block and the lower positioning block respectively form a T-shaped or L-shaped structure with the guiding wall.

In an embodiment of the present invention, the present invention further comprises another driving mechanism having a second SMA wire and a second fixed terminal, and the second fixed terminal is disposed on a side of the plate base opposite to the first fixed terminal, a first end of the second SMA wire is fixed to the sliding plate, and a second end of the first SMA wire is fixed to the second fixed terminal; when the second SMA wire is activated by heating, the second SMA wire is indirectly driven and the insert piece exits from the lens barrel.

In an embodiment of the present invention, a socket is disposed on a side of the wall of the lens barrel adjacent to the plate base, the socket is radially connected to the light-transmissive channel, and the insert piece passes through the socket to enter or exit from the lens barrel when the first SMA wire is deformed by heating.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
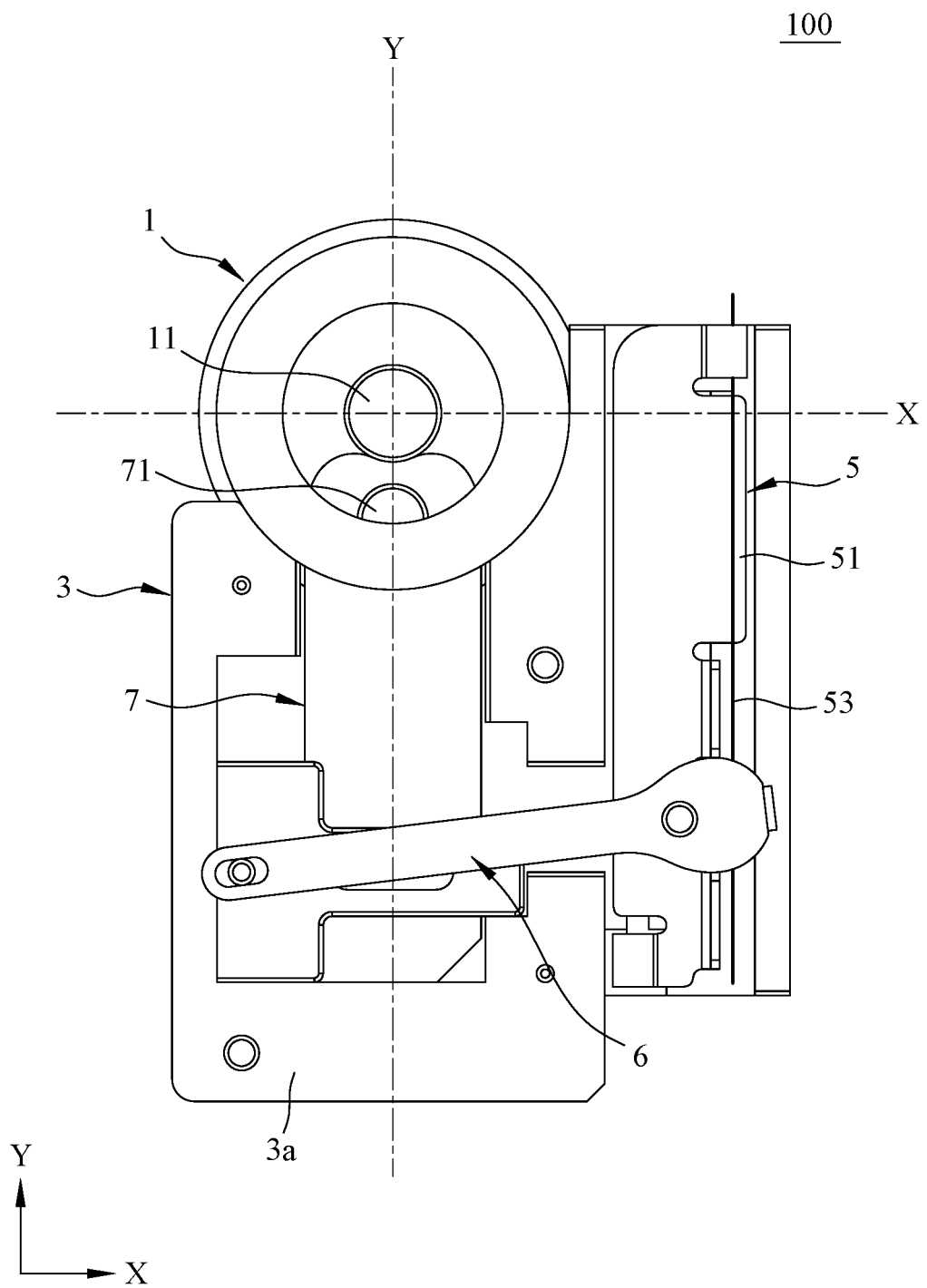
FIG. 1 is a schematic view showing the aperture switching device for use with a lens of a mobile device of the present invention.
Figure 2:
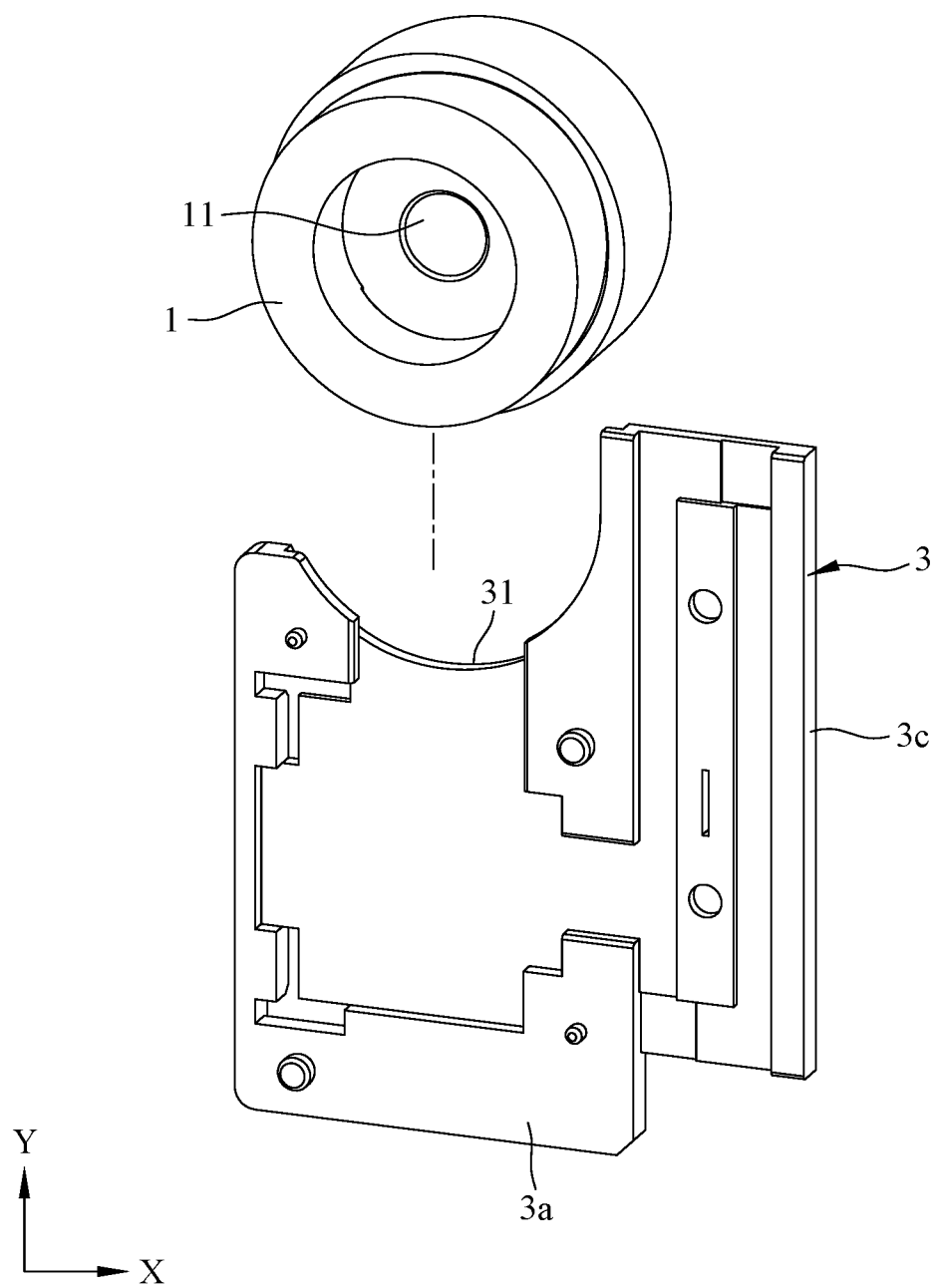
FIG. 2 is a schematic view showing the assembly relation of the plate base and the lens barrel of the present invention.

Refer to FIG. 1, which is a schematic view showing the aperture switching device for use with a lens of a mobile device of the present invention. As shown in FIG. 1 and FIG. 2, the aperture switching device 100 for use with a lens of a mobile device of the present invention is installed to match a lens barrel 1. The aperture switching device 100 for use with a lens of a mobile device of the present invention comprises: a plate base 3, a driving mechanism 5, a connecting rod 6 and a transfer mechanism. The lens barrel 1 is a hollow barrel, and the plate base 3 is disposed outside of the lens barrel 1, and the lens barrel 1 is disposed with a light-transmissive channel 11 in axial direction.

The plate base 3 two plate surfaces 3a, 3b (refer to FIG. 10 for plate surface 3b) and a circumferential side surface 3c (refer to FIG. 2). The two plate surfaces 3a, 3b are located on front and rear sides of the plate base, 3 and one side of the circumferential side surface 3c is close to or abuts against outer circumference of the lens barrel 1.

Preferably, the plate base 3 is a thin plate body, i.e., the thickness of the plate body is significantly thinner than the length and width of the plate surface, or significantly thinner than the axial length of the lens barrel.

Refer to FIG. 2. FIG. 2 is a schematic view showing the assembly relation of the plate base and the lens barrel of the present invention. As shown in FIG. 2, a notch 31 is formed at an end corner or a portion of the plate base 3, and the notch 31 is disposed to allow the lower half of the lens barrel 1 to be accommodated in the notch 31, thereby reducing the internal space occupation ratio of the handheld device. If the contour of the notch 31 matches the contour of the outer side surface of the lens barrel 1 as correspondingly curved, the outer side surface of the lens barrel 1 can be directly fitted to the notch 31, so that the lens barrel 1 and the notch 31 can be pressed against each other, to reduce the occupation ratio of the internal space of the handheld device as well as and the distance between the lens barrel 1 and the transfer mechanism, which helps the transfer mechanism moving to a predetermined location more quickly.

Although the plate body of FIG. 1 is generally L-shaped, other plates such as a U-shaped plate or a plate body having a notch can also achieve the purpose of reducing the space occupancy.

Figure 3:
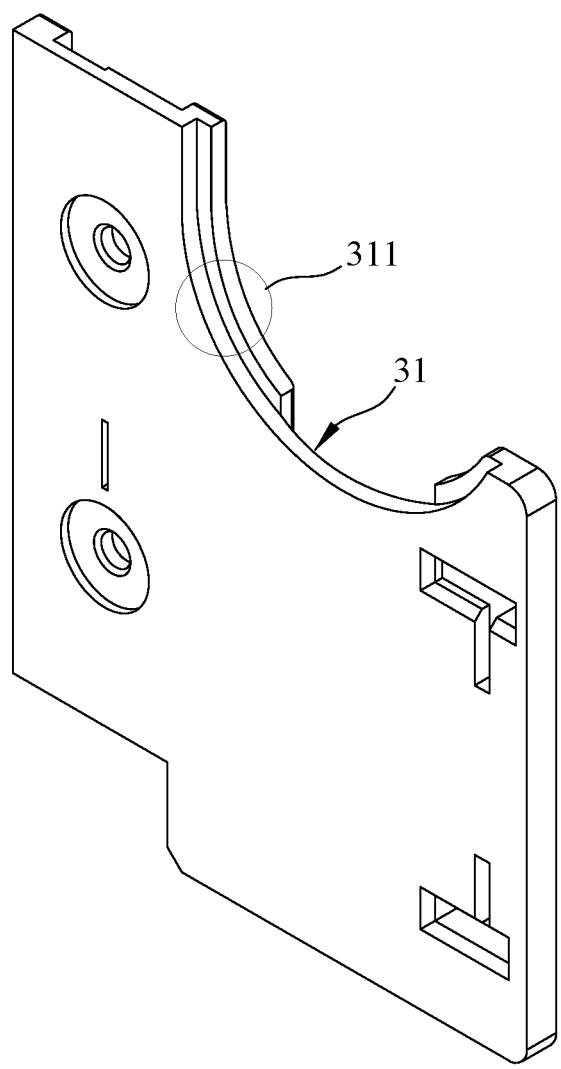
FIG. 3 is a schematic view showing a preferred embodiment of the plate base of the present invention.

Refer to FIG. 3. FIG. 3 is a schematic view showing a preferred embodiment of the plate base of the present invention. When the lens barrel 1 has a segment having a larger or smaller outer diameter, at least a portion of the notch 31 also forms a step-like structure having a step difference, so that when the lens barrel 1 abuts against the notch 31, the portion of the lens barrel 1 having a smaller outer diameter can also be supported by the step-like structure.

As shown in FIG. 1, the driving mechanism 5, the connecting rod 6 and the transfer mechanism are all disposed on a plate surface 3a (front side) of the plate base 3. The driving mechanism 5 and the transfer mechanism are disposed movably along the vertical axis Y of the lens barrel 1 on the plate surface 3a of the plate base 3 and connected through the connecting rod 6. In other words, the connecting rod 6 is connected between the driving mechanism 5 and the transfer mechanism. Preferably, the connecting rod 6 is connected between the driving mechanism 5 and the transfer mechanism in a manner parallel to the horizontal axis X of the lens barrel 1; wherein the driving mechanism 5 is located on the left side or the right side of the lens barrel 1, and the transfer mechanism is disposed on the vertical axis Y of the lens barrel 1.

As shown in FIG. 1, the transfer mechanism and the driving mechanism 5 are disposed on the left and right sides of the plate base 3, and the transfer mechanism is disposed on the vertical axis Y of the lens barrel 1, wherein the left half of the plate base 3 is entirely located below the lens barrel 1. The left half of the connecting rod 6 and the transfer mechanism are disposed on the left half of the plate base 3 and below the lens barrel 1. The entire driving mechanism 5 is disposed on the right half of the plate base 3 and the right side of the lens barrel 1. The upper and lower halves of the driving mechanism 5 respectively correspond to the lens barrel 1 and the transfer mechanism. In principle, the position of the driving mechanism 5 is not limited thereto, and other positions can be selected as long as the driving mechanism 5 does not interfere with the disposition of the lens barrel 1 when moving.

It should be noted that the left or right half of the above-mentioned plate base 3 is not limited to the exact half of the plate base, but is used to facilitate the description of the terms used in the embodiment of the present invention. Therefore, if the area of the left half of the plate base is larger than (less than) the area of the right half, the configuration is also considered to be the left and right halves of the present invention.

Wherein, the driving mechanism 5 at least comprises: a sliding plate 51 and a first SMA wire 53, and the first SMA wire 53 is disposed parallel to the vertical axis Y. Preferably, the first SMA wire 53 maintains a tension state, i.e., stretch/tight/pull.

In principle, a first end (top end) of the first SMA wire 53 is fixed to the sliding plate 51 and a second end (bottom end) of the first SMA wire 53 is fixed to the plate base 3. If the sliding plate 51 is to be moved in a direction away from the lens barrel 1, the second end of the SMA wire 53 is disposed on the side of the plate base 3 away from the lens barrel 1; if the sliding plate 51 is to be moved towards the direction of the lens barrel 1, and the second end of the SMA wire 53 is disposed on the opposite side of the side of the plate base 3 away from the lens barrel 1. The second end of the SMA wire 53 is at an appropriate distance from the sliding plate 51.

Figure 4:
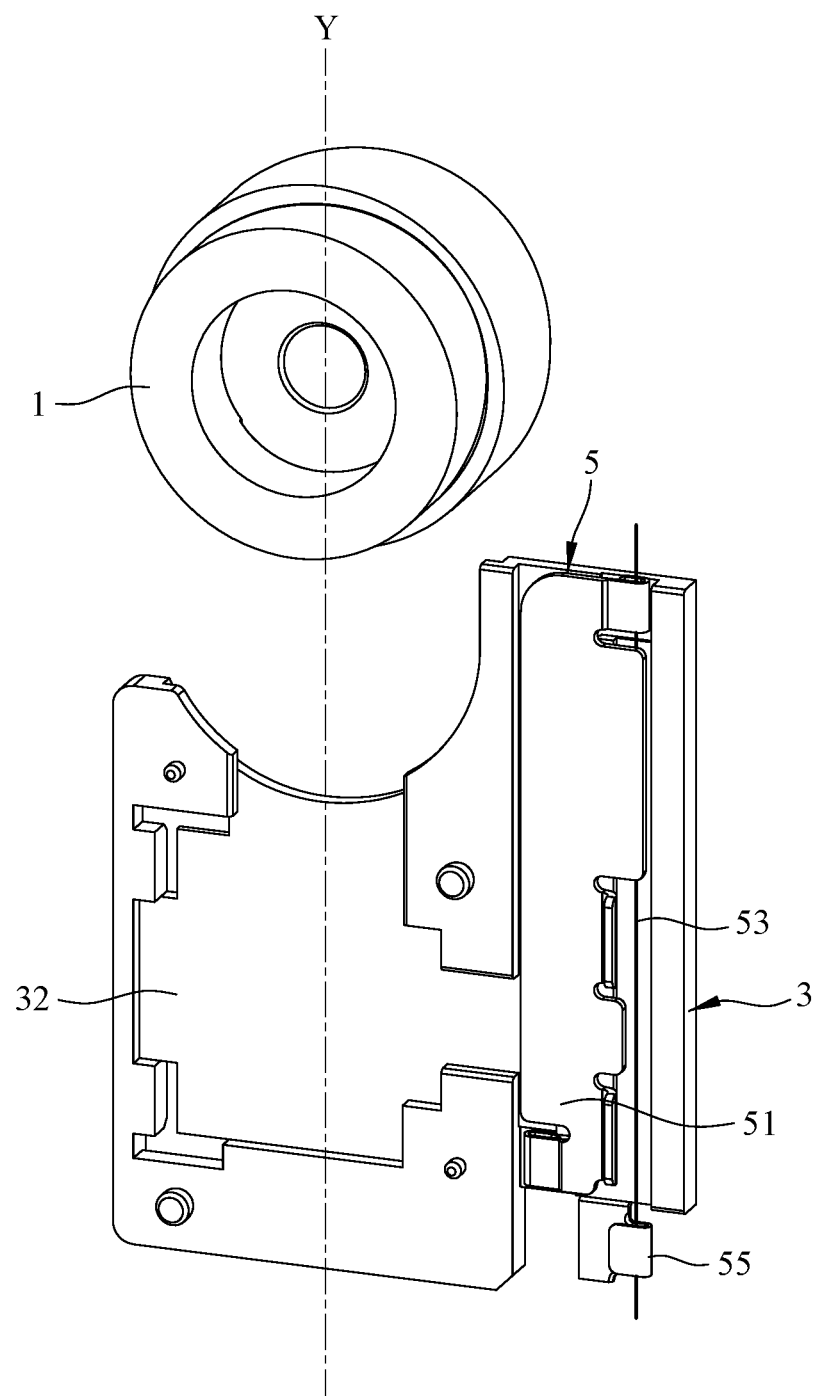
FIG. 4 is schematic view showing a preferred embodiment of the driving mechanism disposed on the plate base of the present invention.

Refer to FIG. 4. FIG. 4 is schematic view showing a preferred embodiment of the driving mechanism disposed on the plate base of the present invention. As shown in FIG. 4, a first fixed terminal 55 is disposed on the plate base 3. According to the above-described disposition principle for the SMA wire 53, the first fixed terminal 55 is fixed to the side of the plate base 3 farthermost from the lens barrel 1. The second end of the SMA wire 53 can be fixed to the first fixed terminal 55, instead of the plate base 3.

The first SMA wire 53 is a wire made of shape memory alloys, a smart material capable of memorizing the original shape; therefore, when the first SMA wire is heated, such as when the present invention is mounted in a mobile device, the SMA wire can be connected to the built-in power source or any power source of the mobile device. When the first SMA wire 53 is electrically heated, the length of the first SMA wire 53 is shortened to drive the sliding plate 51 to move.

Figure 5:
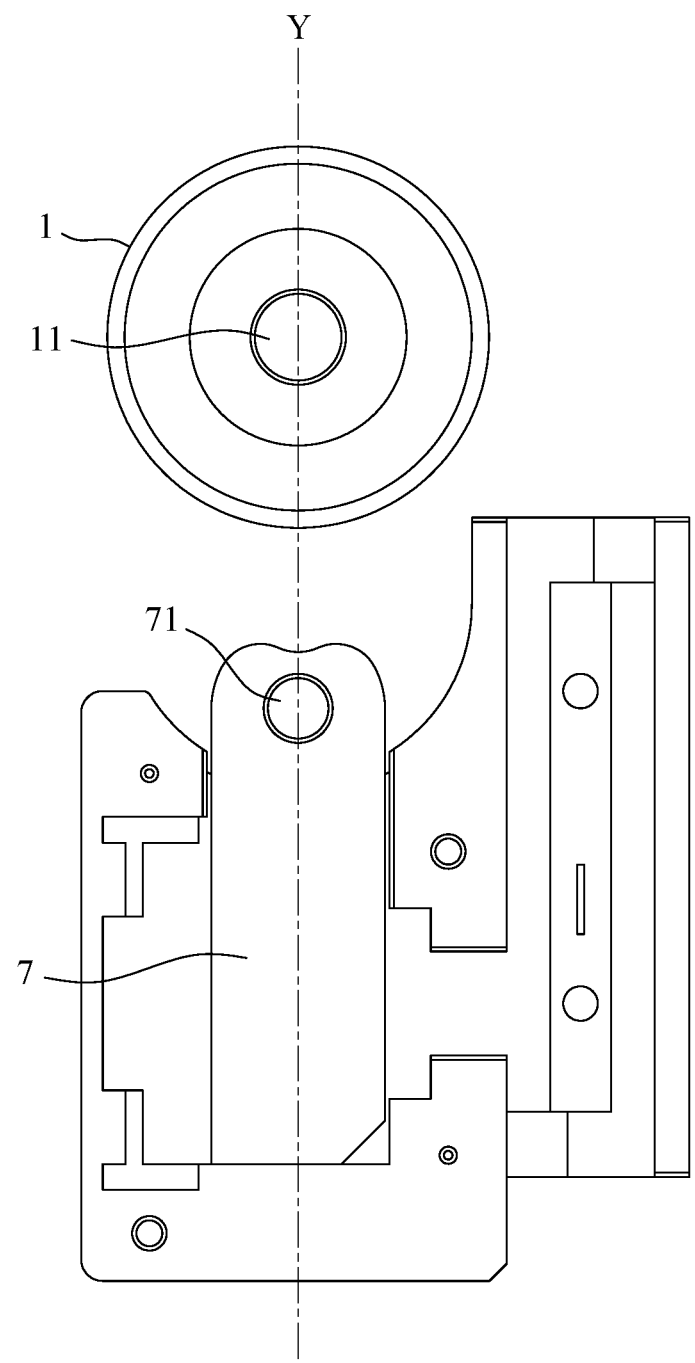
FIG. 5 is schematic view showing the transfer mechanism disposed on the plate base of the present invention.

Refer to FIG. 5. FIG. 5 is schematic view showing the transfer mechanism disposed on the plate base of the present invention. The transfer mechanism comprises an insert piece 7 having a light-transmissive hole 71, the insert piece is oppositely disposed on the vertical axis Y of the lens barrel 1 and movable along the vertical axis Y on the plate surface 3a, wherein inner diameter of the light-transmissive hole 71 is smaller than inner diameter of the light-transmissive channel 11. The vertical axis of the light-transmissive hole 71 may overlap with the vertical axis of the light-transmissive channel 11: wherein a part of the insert piece 7 can be constantly located in the lens barrel 1.

Refer to FIG. 4. The area of the plate base 3 corresponding to the insert piece 7 is further disposed as a rail groove 32, and both sides of the insert piece 7 abut against the opposite inner side wall surfaces of the rail groove 32, so that the insert piece 7 can move along the two opposite inner walls of the rail groove 32.

Figure 6:
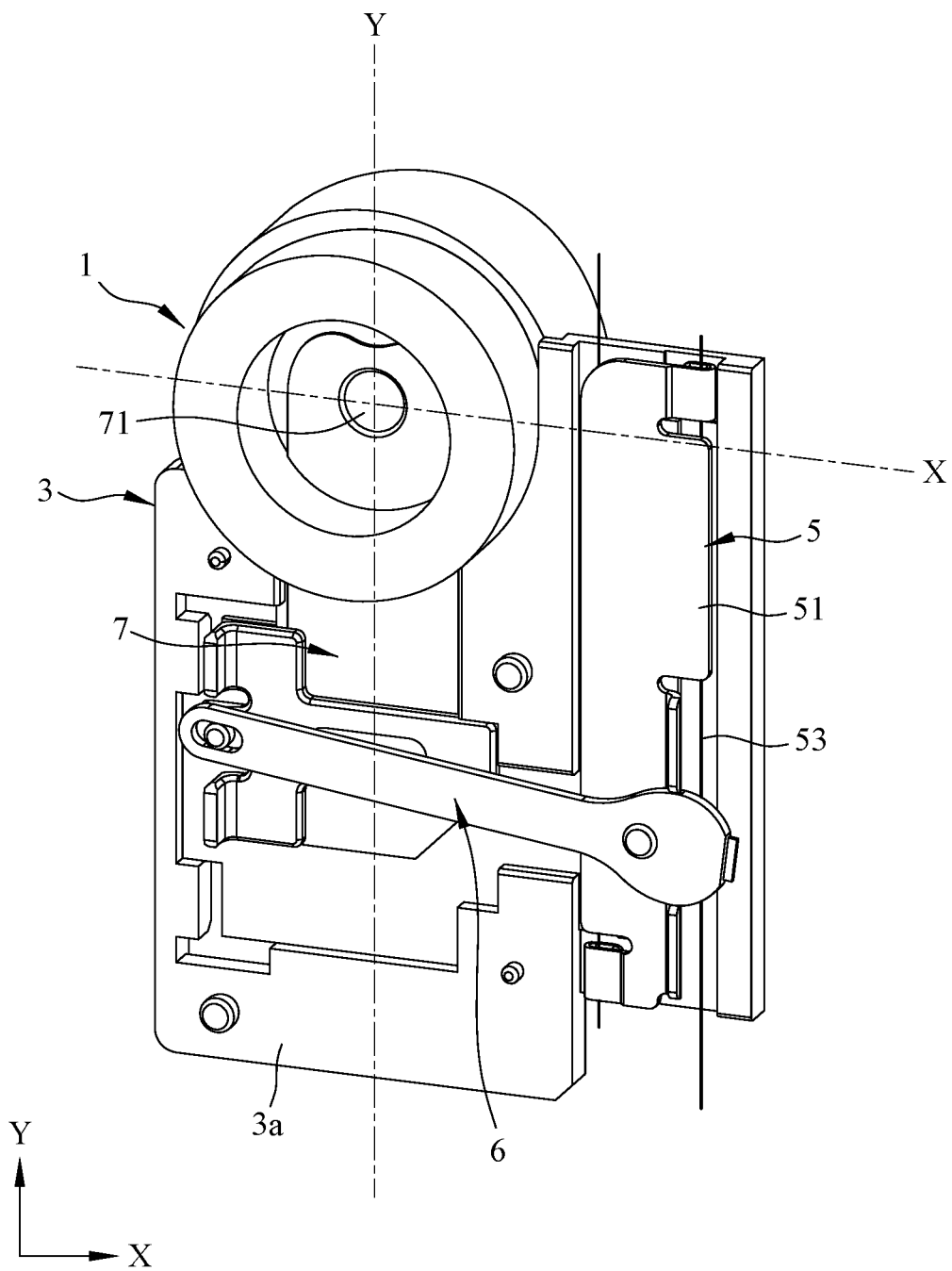
FIG. 6 is schematic view showing the insert piece transferred into the lens barrel of the present invention.

Refer to FIG. 6. FIG. 6 is schematic view showing the insert piece transferred into the lens barrel of the present invention. When the first SMA wire 53 is heated and shortened, the sliding plate 51 is first driven by the first SMA wire 53, thereby sequentially driving the connecting rod 6 and the insert piece 7 to move. The insert piece 7 moves towards the lens barrel 1, and moves to a position where the light-transmissive hole 71 and the light-transmissive channel 11 are mutually corresponding, at this point, amount of light entering the lens barrel 1 is decided by the diameter of the light-transmissive hole 71. Before the first SMA wire 53 is shortened by hating, the amount of light entering the lens barrel 11 is determined by the diameter of the light-transmissive channel 11.

The driving mechanism 5 has a driving mode different from the driving mode of the transfer mechanism. The driving mechanism 5 is directly driven by the first SMA wire 53, and the transfer mechanism is driven by the driving mechanism 5 and the connecting rod 6. Specifically, when the sliding plate 51 is driven by the first SMA wire 53, the end of the connecting rod 6 connected to the sliding plate 51 is driven, and the other end of the connecting rod 6 is also driven, wherein the two ends of the connecting rod 6 is move in opposite directions; therefore, the insert piece 7 coupled to the other end of the connecting rod 6 is brought close to (away from) the lens barrel.

Figure 7:
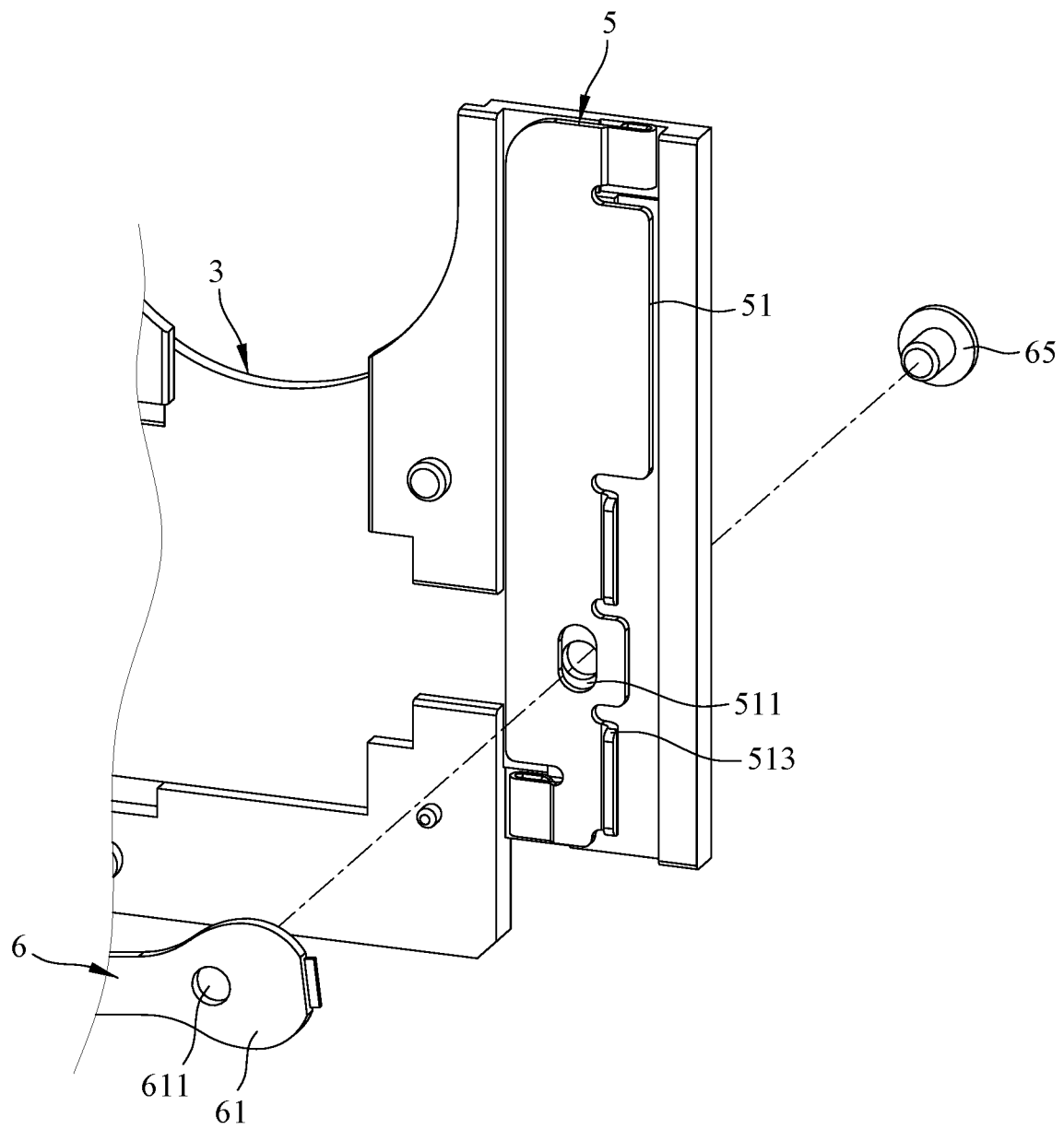
FIG. 7 is a schematic view showing a preferred embodiment of the connecting rod connected to the sliding plate of the present invention.

Refer to FIG. 7. FIG. 7 is a schematic view showing a preferred embodiment of the connecting rod connected to the sliding plate of the present invention. As shown in FIG. 7, a preferred embodiment of the connecting rod 6 connected to the sliding plate is: a shaft 65 is further disposed protruding from the plate base 3, an end of a the connecting rod 6 near the sliding plate 51 is a first end 61; wherein the first end 61 is located above the sliding plate 51 and the first end 61 has a shaft hole 611. The sliding plate 51 further comprises a guiding long hole 511 and a joint opening 513, the guiding long hole 511 is disposed in a lower half of the sliding plate 51 and corresponding to the shaft hole 611, the shaft 65 passes through the guiding long hole 511 and the shaft hole 611 to make the first end 61 pivotally connected to the shaft 65, wherein two long sides of the guiding long hole 511 are in constant contact with the shaft 65, and the long side of the guiding long hole 511 is in the same direction as the vertical axis Y of the lens barrel 1.

Preferably, the shaft 65 is a T-screw, and the free end of the shaft 65 can lock the nut (not shown) to prevent the first end 61 of the connecting rod 6 from disengaged from the shaft 65.

An embodiment of forming the joint opening 513 is to bend a portion of a long side of the sliding plate 51 into a folded edge, and an opening is formed in the folded edge to form the joint opening 513. As shown in FIG. 7, the joint opening 513 is disposed at right side of the lower half of the sliding plate 51. Preferably, the joint opening 513 and the shaft hole 611 are parallel and the first end 61 is stuck into the joint opening 513. In other words, the top side and the bottom of the first end 61 abut against respectively the inner side walls of the joint opening 513.

As such, the first end 61 of the connecting rod 6 is pivotally connected to the plate seat 3 while being engaged with the sliding plate 51. Therefore, when the sliding plate 51 moves, the first end 61 of the connecting rod 6 will move together with the sliding plate 51, and at the same time, the second end 63 (refer to FIG. 8) is moved. Through the disposition of the guiding long hole 511, the sliding plate 51 can be made to move more linearly. Preferably, the outer contour of the first end 61 of the connecting rod 6 has an arc shape.

Figure 8:
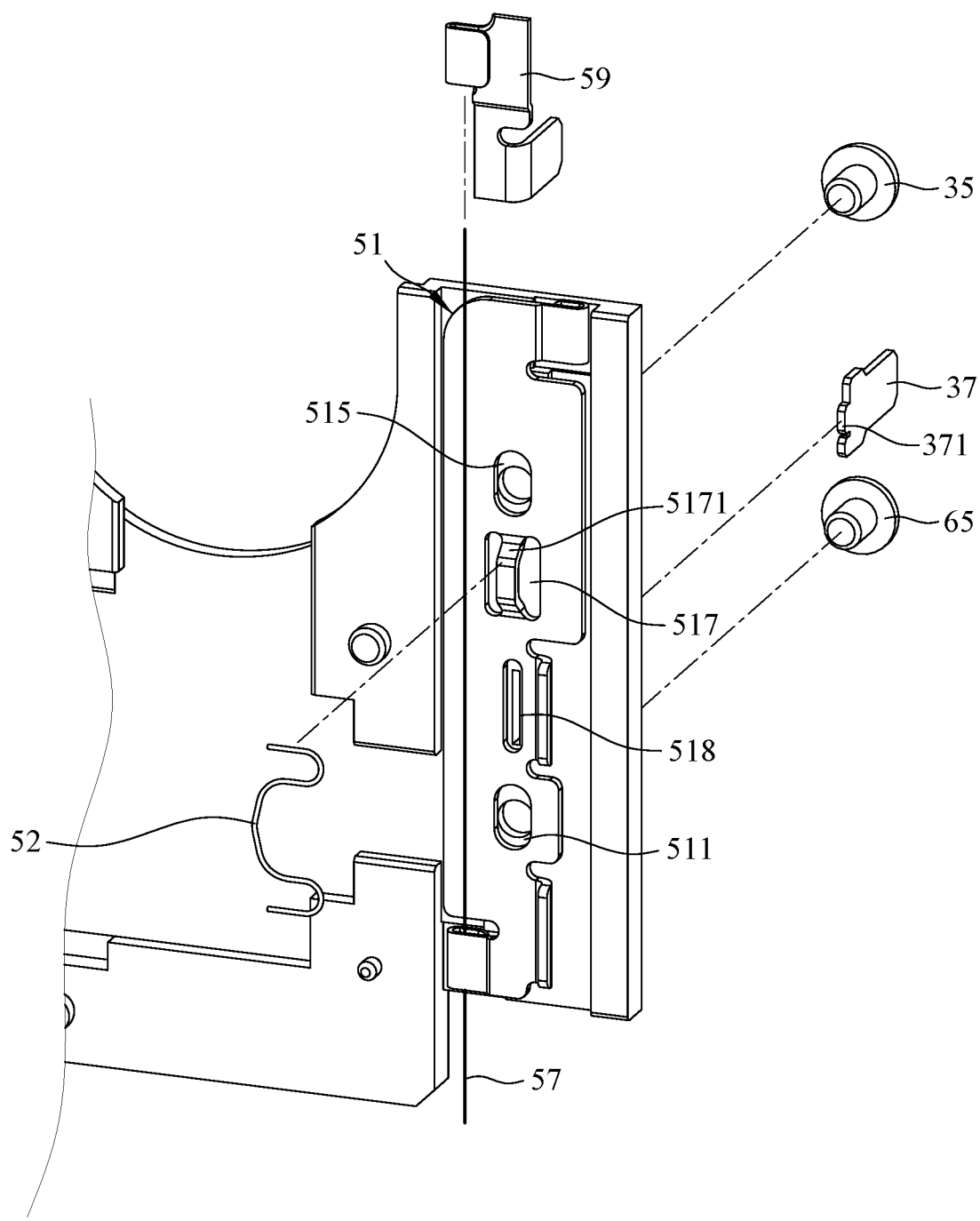
FIG. 8 is schematic view showing an optimal embodiment of the sliding plate of the present invention.

Refer to FIG. 8. FIG. 8 is schematic view showing an optimal embodiment of the sliding plate of the present invention. An orientation rod 35 is further disposed protruding on the plate surface 3a. The sliding plate 51 is further disposed with an orientation length hole 515. The orientation long hole 515 is disposed in an upper half of the sliding plate 51. The orientation rod 35 protrudes through the orientation long hole 515, wherein the corresponding two long sides of the orientation long hole 515 are in constant contact with the orientation rod 35, and the long side of the orientation long hole 515 is in the same direction as the vertical axis Y of the lens barrel 1. Preferably, the orientation long hole 515 and the guiding long hole 511 are aligned with each other; the disposition of the orientation long hole 515 and the orientation rod 35 are just like the guiding long hole 511 and the shaft 65, so that the sliding plate 51 can move more linearly.

Moreover, the present invention further comprises a grounding terminal 37 and an elastic member 52. The grounding terminal 37 is disposed on the plate surface 3a, and the elastic element 52 is disposed on the sliding plate 51. The sliding plate 51 has two openings 517, 518, and the two openings 517, 518 are disposed adjacent to each other in the upper and lower manner and in moving direction of the sliding plate 51. Preferably, the two openings 517, 518 are disposed between the guiding long hole 511 and the orientation long hole 515. More preferably, the two openings 517, 518 and the guiding long hole 511 are aligned with the orientation long hole 515.

The grounding terminal 37 protrudes through the opening 518, and the other opening 517 is disposed longitudinally with a span rod 5171 which has a curve arc shape, and the two ends of the elastic member 52 abut against the grounding terminal 37 and the span rod 5171 respectively. Therefore, the first (second) SMA wire, the sliding plate and the grounding terminal are in substantial contact with each other; wherein the elastic member 52 is an elastic component composed of a plurality of turning portions, a spring component or a component having elasticity.

An embodiment of the elastic member 52 can be: the two ends of the elastic member 52 are bent portions. For example, in the present embodiment, the two ends of the elastic member 52 are U-shaped bent portions, and the middle portion of the elastic member 52 is also roughly U-shaped and elastic. The shape of the elastic member 52 is wavy.

Preferably, top side of the grounding terminal 37 further forms a winding portion 371 for winding the U-shaped bent portion (see FIG. 12); thereby, the elastic member 52 uses the U-shaped bent portion to abut against the span rod 5171 and is wound around the ground terminal 37.

Figure 9:
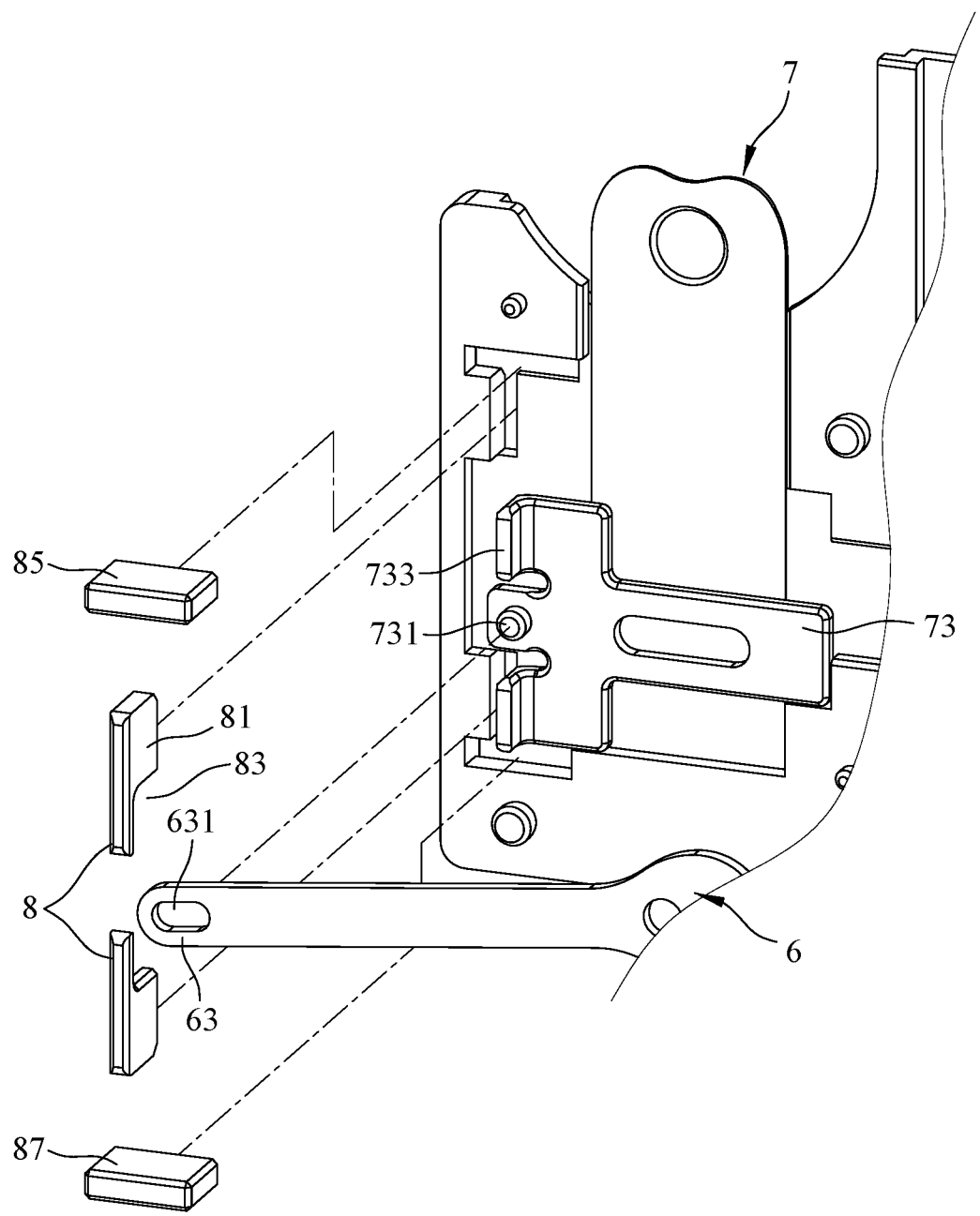
FIG. 9 is a schematic view showing a preferred embodiment of the connecting rod connected to the transfer mechanism of the present invention.

Refer to FIG. 9. FIG. 9 is a schematic view showing a preferred embodiment of the connecting rod connected to the transfer mechanism of the present invention. As shown in FIG. 9, the preferred embodiment of the connecting rod connected to the transfer mechanism is: the second end of the connecting rod 6 has a trepan hole 631, a guiding carrier 73 is further disposed between the second end 63 and the insert piece 7. The guiding carrier 73 uses a surface facing the plate surface 3a to be integrally connected with the insert piece 7. A protruding rod 731 is disposed protruding from a surface of the guiding carrier 73 facing away from the plate surface 3a, and the second end 63 of the connecting rod 6 is sleeved on the protruding rod 731 using the trepan hole 631 and forming connection with the guiding carrier 73.

The free end of the protruding rod 731 can further can connectedly latched to the nut (not shown) to prevent the second end 63 of the connecting rod 6 from disengaged from the protruding rod 731.

Moreover, the present invention further comprises a guiding wall 8, the guiding wall 8 is disposed upright on the plate base 3 and parallel to the insert piece 7. A side of the guiding wall 8 facing the guiding carrier 73 is a guiding plane 81, and the guiding plane 81 is parallel to the vertical axis Y of the lens barrel 1. One end of the guiding carrier 73 abuts against the guiding plane 81. Preferably, the guiding wall 8 is magnetic and can magnetically attract the guiding carrier 73. Preferably, the side of the guiding carrier 73 against the guiding wall 8 is bent into a standing portion 733. The guiding carrier 73 abuts against the guiding wall 8 with the standing portion 733.

By disposing the guiding carrier between the connecting rod and the insert piece, the connecting rod directly drives the guiding carrier to move rather than driving the thinner insert piece 7 to prevent the thinner insert piece 7 from deformation or damage, and the guiding effect is effectively improved by the plane-to-plane contact between the standing portion of the guiding carrier and the surface of the guiding plane.

Wherein the bottom side of the middle portion of the guiding wall 8 is a hollow portion 83, the hollow portion 83 is opened to expose the plate surface 3*a* (corresponding to the portion of the middle portion of the guiding wall 8) to allow the second end 63 of the connecting rod 6 to be in the hollow portion 83 of the guiding wall 8. Therefore, when the second end 63 of the connecting rod 6 is driven, the second end 63 of the connecting rod 6 can move back and forth under the guiding wall 8.

Furthermore, Since the protruding rod 731 is also disposed on a side of the guiding carrier 73 adjacent to the guiding wall 8, a middle portion of the standing portion 733 forms a breaking portion, and the protruding rod 731 is disposed in the breaking portion. The formation of the standing portion 733 is to increase the contact area between the guiding carrier 73 and the guiding wall 8, so that when the guiding carrier 73 moves along the guiding wall 8, the guiding carrier 73 can move stably.

Even as shown in FIG. 9, the guiding wall 8 can also comprises two independent members having magnetic properties, wherein the sides of the two members facing the guiding wall 8 are planar and coplanar.

Moreover, an upper positioning block 85 and a lower positioning block 87 are respectively disposed at top end and bottom end of the guiding wall 8. Preferably, the upper positioning block 85 and the lower positioning block 87 are both magnetic, and the upper positioning block 85 and the lower positioning block 87 respectively form a T-shaped or L-shaped structure with the guiding wall 8. In other words, the upper positioning block 85 and the lower positioning block 87 are vertically disposed on the guiding wall 8 and are disposed corresponding to each other. When the guiding carrier 73 abuts against the upper positioning block 85, the guiding carrier 73 is magnetically attracted by the upper positioning block 85 and also subjected to the magnetic attraction force constantly provided by the guiding wall 8. At this point, even if the electricity supplied to the first SMA wire 53 stops, the guiding carrier 73 is stably attracted by the magnetic force of the upper positioning block 85 to stay in a fixed position and do not move freely.

Refer to FIG. 8 again. The present invention further comprises another driving mechanism. The another driving mechanism uses the same components as the driving mechanism 5. That is, the another driving mechanism has a second SMA wire 57 and a second fixed terminal 59. The disposition of the second SMA wire 57 and the second fixed terminal 59 are the same as the first SMA wire and the first fixed terminal described earlier, except that the second fixed terminal is fixed to the opposite side of the first fixed terminal (refer to FIG. 10) so that when the second SMA wire 59 is activated by heating, the second SMA wire 59 is indirectly driven and the insert piece 7 exits from the lens barrel 1.

Figure 10:
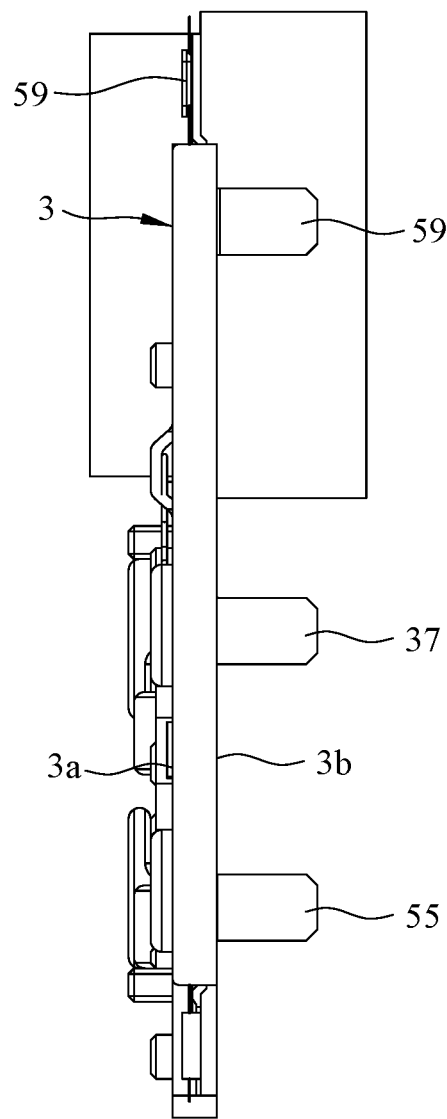
FIG. 10 is a schematic view showing an embodiment of the grounding terminal, the first fixed terminal, and the second fixed terminal disposed on the plate base of the present invention.

Refer to FIG. 10. FIG. 10 is a schematic view showing an embodiment of the grounding terminal, the first fixed terminal, and the second fixed terminal disposed on the plate base of the present invention. As shown in FIG. 10, the bottom of the grounding terminal 37 also passes through the rear side of the plate base 3 (plate surface 3*b*), and the top of the grounding terminal 37 protrudes through the plate surface 3*a*, so that the electrical connection between the grounding terminal 37 and the grounding wire is on the side of the plate base 3 not disposed with any component, which is convenience for performing electrical connection. Similarly, to facilitate connection to the positive and negative poles of the power source, one end portion of the first fixed terminal 55 and the second fixed terminal 59 also passes through the rear side (plate surface 3*b*) of the plate base 3. In addition, the middle portion of the first fixed terminal 55 and the second fixed terminal 59 passes through the plate base 3, and the other end portion surround the circumferential side 3*c* from the plate.

Figure 11:
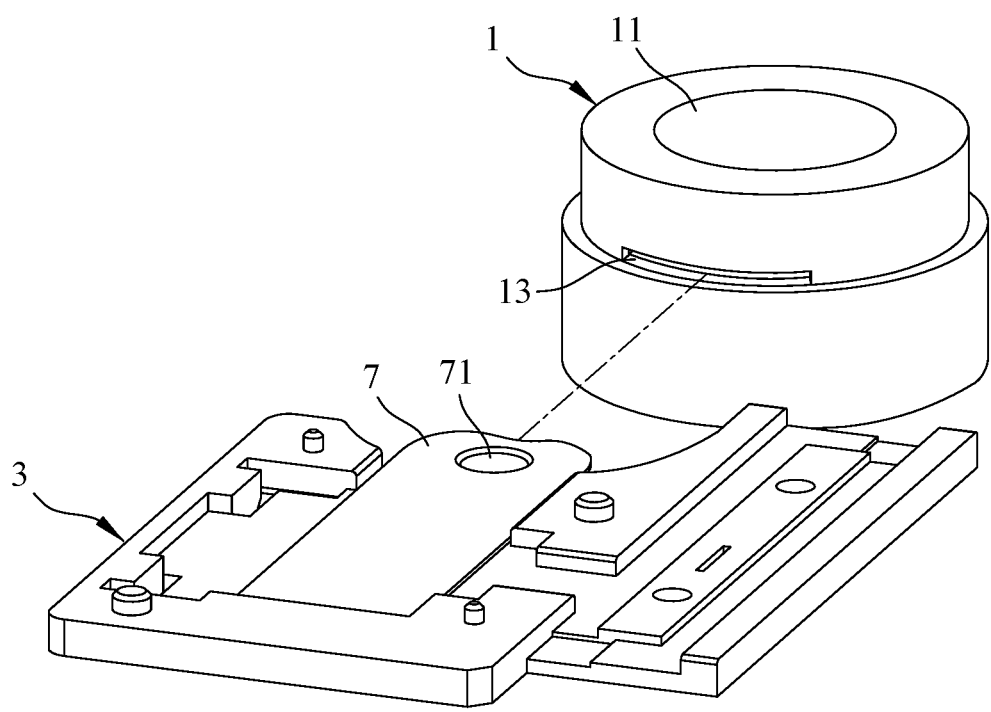
FIG. 11 is a schematic view showing a preferred embodiment of the lens barrel of the present invention.

Refer to FIG. 11. FIG. 11 is a schematic view showing a preferred embodiment of the lens barrel of the present invention. A socket 13 is disposed on a side of the wall of the lens barrel 1 adjacent to the plate base 3, the socket 13 is radially connected to the light-transmissive channel 11 and faces the insert piece 7. The insert piece 7 passes through the socket 13 to enter or exit from the lens barrel 1 when the first SMA wire 53 is deformed by heating.

In an embodiment of the present invention, the first (second) SMA wire is integrally connected with the sliding plate and the first (second) fixed terminal by a press manner. In the case of the sliding plate, a part of the sliding plate is folded and pressed to fix one end of the first (second) SMA wire. In addition to the press and fixing manner, the first (second) SMA wire can also be connected by heat welding, welding, bonding or other fixing manner.

Figure 12:
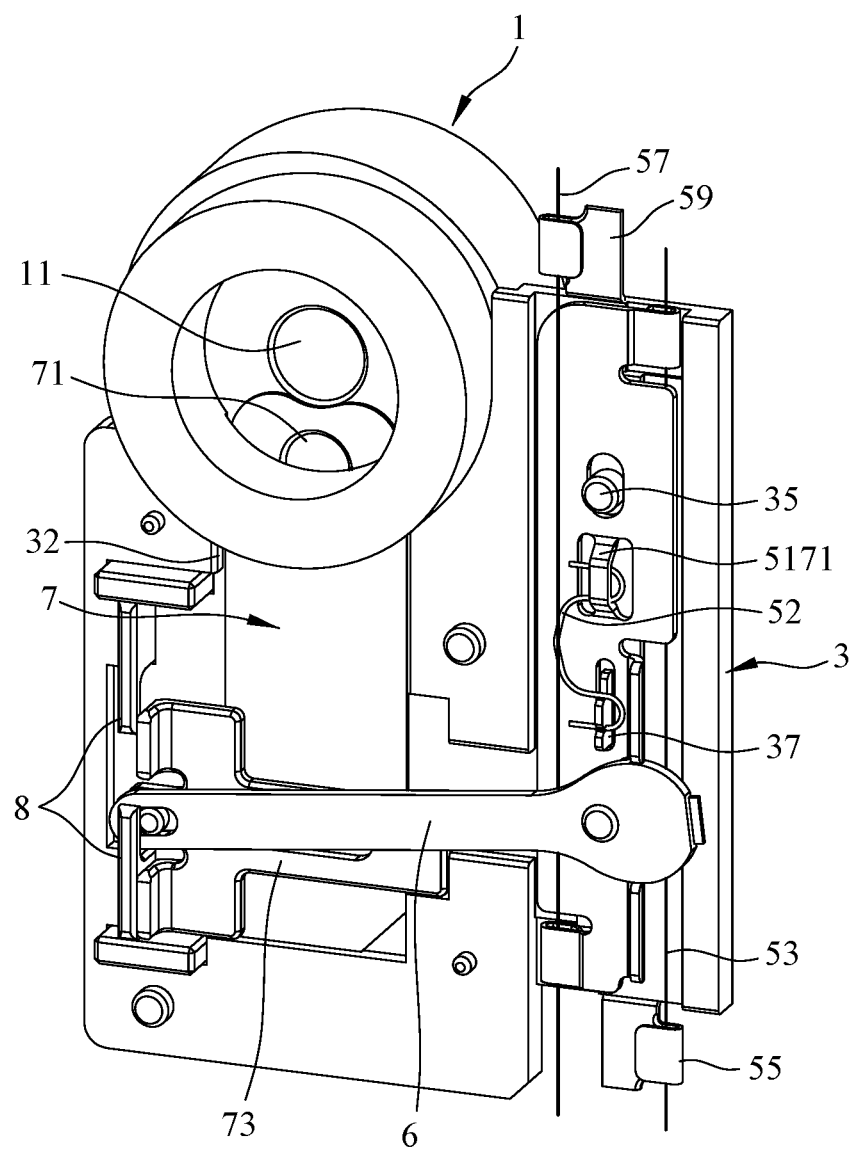
FIG. 12 is a schematic view showing an optimal embodiment of the aperture switching device for use with a lens of a mobile device of the present invention.

Refer to FIG. 12. FIG. 12 is a schematic view showing an optimal embodiment of the aperture switching device for use with a lens of a mobile device of the present invention. As shown in FIG. 12, a driving mechanism and another driving mechanism are disposed at the same time, so that the light-transmissive hole of the insert piece can be quickly driven to correspond to or be separated from the light-transmissive channel of the lens; and the sliding plate structure is the same as the preferred embodiment of the sliding plate of FIG. 8. Therefore, the sliding plate can maintain linear movement. In addition, the rail groove on the plate base can also maintain linear movement of the insert piece; furthermore, the magnetic attraction between the guiding carrier and the guiding wall also helps the steady and smooth movement of the insert piece.

Since the technology of the present invention is not found in published publications, periodicals, magazines, media, exhibition venues, and thus is novel, and can be implemented by overcoming the current technical bottlenecks, the progressiveness is demonstrated. In addition, the present invention can solve the problems of the conventional technology, improve the overall use efficiency, and can achieve the value of industrial utilization.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An aperture switching device for use with a lens of a mobile device, comprising:
    a plate base, the plate base being disposed outside a lens barrel, and the lens barrel being disposed with a light-transmissive channel in an axial direction, the plate base having two plate surfaces and a circumferential side surface, the two plate surfaces being located on front and rear sides of the plate base, and one side of the circumferential side surface being close to or abutting against outer circumference of the lens barrel;

a driving mechanism, a connecting rod and a transfer mechanism being all disposed on the plate surface on the front side, the driving mechanism and the transfer mechanism being movably disposed on the plate surface on the front side in a manner of relatively moving with respect to a vertical axis of the lens barrel; the driving mechanism being disposed on a left side or a right side of the lens barrel, and the transfer mechanism being disposed on the vertical axis of the lens barrel; the driving mechanism having a sliding plate and being coupled to the transfer mechanism by the connecting rod, and the connecting rod being connected between the driving mechanism and an insert in a manner parallel to a horizontal axis of the lens barrel; and a grounding terminal and an elastic member, the grounding terminal being disposed on the plate surface on the front side, the sliding plate having two openings disposed adjacent to each other in a moving direction of the sliding plate, the grounding terminal protruding through one of the two openings, the other of the two openings being disposed longitudinally with a span rod, and the two ends of the elastic member abutting against the grounding terminal and the span rod respectively;

wherein the driving mechanism further comprises a first shape memory alloy (SMA) wire, the first SMA wire being disposed parallel to the vertical axis, and a first end of the first SMA wire being fixed to the sliding plate and a second end of the first SMA wire being fixed to the plate base;

the transfer mechanism further comprises an insert piece having a light-transmissive hole, the insert piece being oppositely disposed on the vertical axis of the lens barrel and movable along the vertical axis on the plate surface on the front side, an inner diameter of the light-transmissive hole being smaller than an inner diameter of the light-transmissive channel; and when the first SMA wire is heated and shortened, the sliding plate is first driven by the first SMA wire, thereby sequentially driving the connecting rod and the insert piece to move, the insert piece moves towards the lens barrel, and moves to a position where the light-transmissive hole and the light-transmissive channel are mutually corresponding, and at this point, amount of light entering the lens barrel is decided by the inner diameter of the light-transmissive hole.

2. The aperture switching device for use with a lens of a mobile device according to claim 1, wherein a portion of the plate base further defines a notch, the notch has a contour corresponding to an outer contour of the lens barrel, a portion of the lens barrel is received in the notch, and the lens barrel can directly abut against the notch.

3. The aperture switching device for use with a lens of a mobile device according to claim 2, wherein when the lens barrel has a segment having a larger or smaller outer diameter, at least a portion of the notch also forms a step-like structure having a step difference, so that when the lens barrel abuts against the notch, the portion of the lens barrel having a smaller outer diameter can also be supported by the step-like structure.

4. The aperture switching device for use with a lens of a mobile device according to claim 1, wherein a first fixed terminal is disposed on a side of the plate base and spaced apart from the sliding plate, and the second end of the first SMA wire is fixed to the first fixed terminal instead of to the plate base, and the first fixed terminal is fixed to a side of the plate base away from the lens barrel.

5. The aperture switching device for use with a lens of a mobile device according to claim 4, wherein the aperture switching device further comprises another driving mechanism having a second SMA wire and a second fixed terminal, and the second fixed terminal is disposed on a side of the plate base opposite to the first fixed terminal, a first end of the second SMA wire is fixed to the sliding plate, and a second end of the first SMA wire is fixed to the second fixed terminal; and when the second SMA wire is activated by heating, the second SMA wire is indirectly driven and the insert piece exits from the lens barrel.

6. The aperture switching device for use with a lens of a mobile device according to claim 4, wherein a portion of the first fixed terminal also passes through the plate surface on the rear side of the plate base, the first fixed terminal comprises also the portion protruding into the plate base and the portion protruding through the circumferential side of the plate base.

7. The aperture switching device for use with a lens of a mobile device according to claim 1, wherein an area of the plate base corresponding to the insert piece is further disposed as a rail groove, and both sides of the insert piece abut against two opposite inner sidewalls of the rail groove, so that the insert piece can move along the two opposite inner sidewalls of the rail groove.

8. The aperture switching device for use with a lens of a mobile device according to claim 1, wherein a shaft is further disposed protruding from the plate base, and the connecting rod has a first end and a second end, the first end of the connecting rod has a shaft hole, and the sliding plate further comprises a guiding long hole and a joint opening, the guiding long hole is disposed in a lower half of the sliding plate and corresponding to the shaft hole, the shaft passes through the guiding long hole and the shaft hole to make the first end of the connecting rod pivotally connected to the shaft, wherein two long sides of the guiding long hole are in constant contact with the shaft, and the long sides of the guiding long hole are in the same direction as the vertical axis of the lens barrel; a portion of a long side of the sliding plate is bent into a folded edge, and an opening is formed in the folded edge to form the joint opening, and the first end of the connecting rod is stuck into the joint opening.

9. The aperture switching device for use with a lens of a mobile device according to claim 8, wherein an orientation rod is further disposed protruding on the plate surface on the front side; the sliding plate is further disposed with an orientation long hole; the orientation long hole is disposed in an upper half of the sliding plate, the orientation rod protrudes through the orientation long hole, wherein two corresponding long sides of the orientation long hole are in constant contact with the orientation rod, and the long sides of the orientation long hole are in the same direction as the vertical axis of the lens barrel.

10. The aperture switching device for use with a lens of a mobile device according to claim 1, wherein the two ends of the elastic member are two U-shaped bent portions, and a middle portion of the elastic member is also roughly U-shaped and elastic, the elastic member has a wavy shape, a top side of the grounding terminal further forms a winding portion; and the elastic member uses one U-shaped bent portion to abut against the span rod and the other U-shaped bent portion is wound around the winding portion of the ground terminal.

11. The aperture switching device for use with a lens of a mobile device according to claim 1, wherein a portion of the grounding terminal also protrudes through the plate surface on the rear side of the plate base.

12. The aperture switching device for use with a lens of a mobile device according to claim 1, wherein a socket is disposed on a side of the wall of the lens barrel adjacent to the plate base, the socket is radially connected to the light-transmissive channel, and the insert piece passes through the socket to enter or exit from the lens barrel when the first SMA wire is deformed by heating.

13. An aperture switching device for use with a lens of a mobile device, comprising:
   a plate base, the plate base being disposed outside a lens barrel, and the lens barrel being disposed with a light-transmissive channel in an axial direction, the plate base having two plate surfaces and a circumferential side surface, the two plate surfaces being located on front and rear sides of the plate base, and one side of the circumferential side surface being close to or abutting against outer circumference of the lens barrel;
   a driving mechanism, a connecting rod and a transfer mechanism being all disposed on the plate surface on the front side, the driving mechanism and the transfer mechanism being movably disposed on the plate surface on the front side in a manner of relatively moving with respect to a vertical axis of the lens barrel; the driving mechanism being disposed on a left side or a right side of the lens barrel, and the transfer mechanism being disposed on the vertical axis of the lens barrel; the driving mechanism having a sliding plate and being coupled to the transfer mechanism by the connecting rod, and the connecting rod being connected between the driving mechanism and an insert in a manner parallel to a horizontal axis of the lens barrel;
   wherein the driving mechanism further comprises a first shape memory alloy (SMA) wire, the first SMA wire being disposed parallel to the vertical axis, and a first end of the first SMA wire being fixed to the sliding plate and a second end of the first SMA wire being fixed to the plate base;
   the transfer mechanism further comprises an insert piece having a light-transmissive hole, the insert piece being oppositely disposed on the vertical axis of the lens barrel and movable along the vertical axis on the plate surface on the front side, an inner diameter of the light-transmissive hole being smaller than an inner diameter of the light-transmissive channel;
   when the first SMA wire is heated and shortened, the sliding plate is first driven by the first SMA wire, thereby sequentially driving the connecting rod and the insert piece to move, the insert piece moves towards the lens barrel, and moves to a position where the light-transmissive hole and the light-transmissive channel are mutually corresponding, and at this point, amount of light entering the lens barrel is decided by the inner diameter of the light-transmissive hole; and
   the second end of the connecting rod has a trepan hole, a guiding carrier is further disposed between the second end of the connecting rod and the insert piece, and the guiding carrier uses a surface facing the plate surface on the front side to be integrally connected with the insert piece; a protruding rod is disposed protruding from a surface of the guiding carrier facing away from the plate surface on the front side, and the second end of the connecting rod is sleeved on the protruding rod using the trepan hole.

14. The aperture switching device for use with a lens of a mobile device according to claim 13, further comprising a guiding wall, the guiding wall being disposed upright on the plate base, a side of the guiding wall facing the guiding carrier being a guiding plane, and the guiding plane being parallel to the vertical axis of the lens barrel; one end of the guiding carrier abutting against the guiding plane, and the guiding wall being magnetic and able to magnetically attract the guiding carrier.

15. The aperture switching device for use with a lens of a mobile device according to claim 14, wherein a side of the guiding carrier against the guiding wall is bent into a standing portion, and the guiding carrier abuts against the guiding wall with the standing portion.

16. The aperture switching device for use with a lens of a mobile device according to claim 15, wherein a bottom side of a middle portion of the guiding wall is a hollow portion, the second end of the connecting rod being in the hollow portion of the guiding wall.

17. The aperture switching device for use with a lens of a mobile device according to claim 15, wherein the protruding rod is disposed on a side of the guiding carrier adjacent to the guiding wall, a middle portion of the standing portion forms a breaking portion, the protruding rod is disposed in the breaking portion, and the second end of the connecting rod is in the hollow portion of the guiding wall.

18. The aperture switching device for use with a lens of a mobile device according to claim 13, wherein an upper positioning block and a lower positioning block are respectively disposed at top end and bottom end of the guiding wall, and the upper positioning block and the lower positioning block are both magnetic, the upper positioning block and the lower positioning block respectively form a T-shaped or L-shaped structure with the guiding wall.

* * * * *